United States Patent Office 3,088,493
Patented May 7, 1963

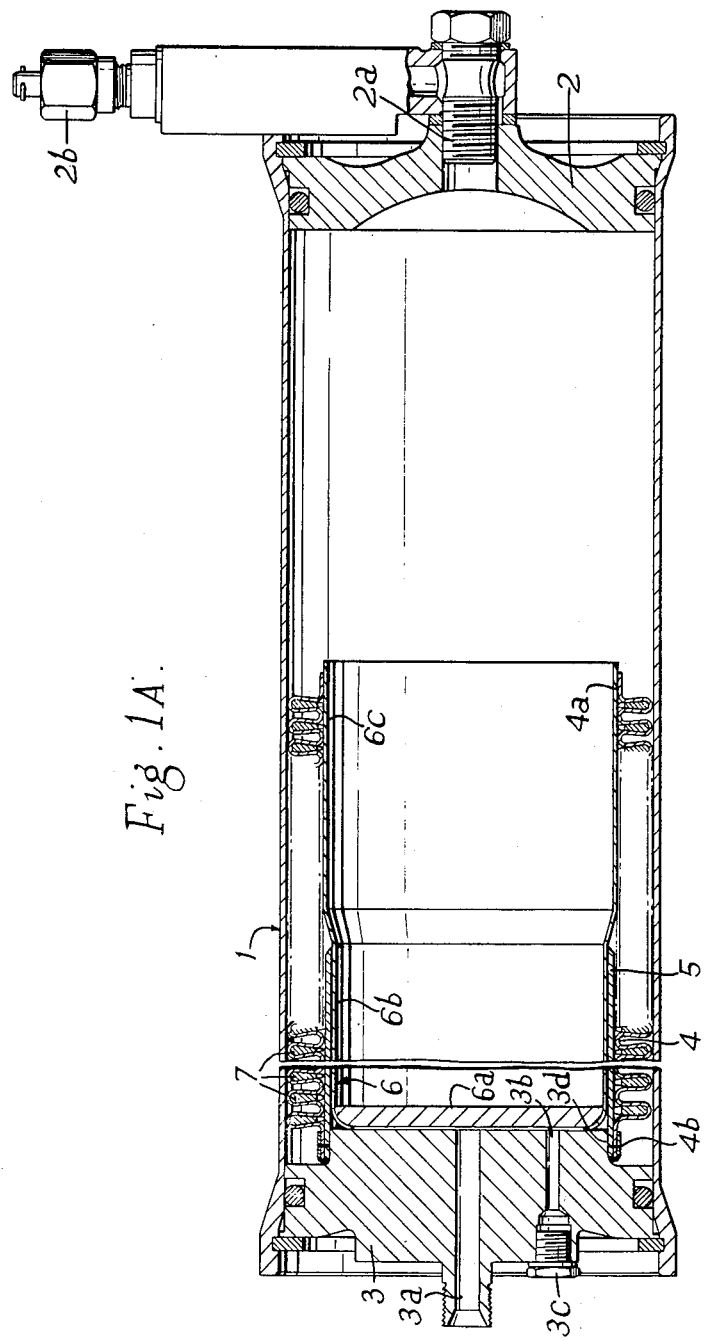

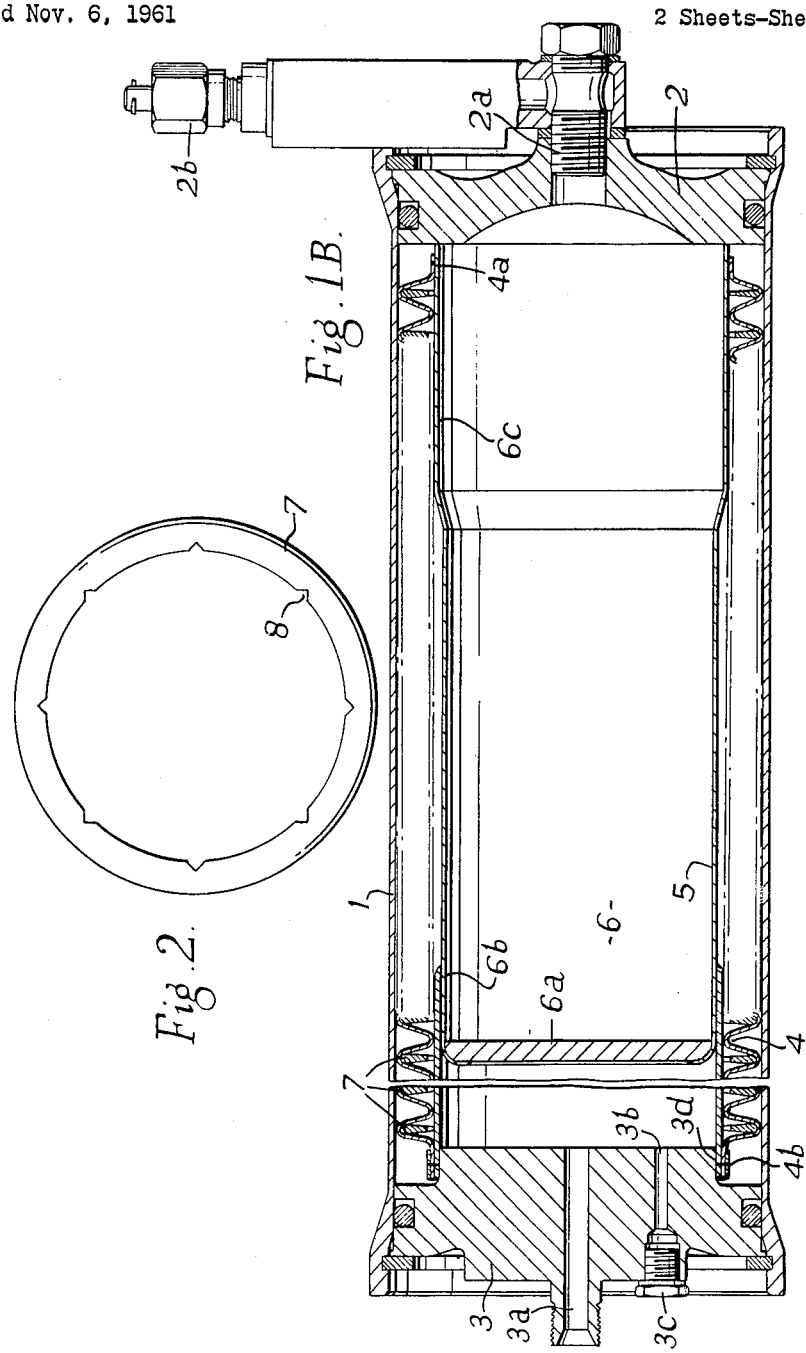

3,088,493
HYDRAULIC ACCUMULATORS
Frederick Baines, Swindon, and Kenneth John William Sheffield, Witney, England, assignors to The Plessey Company Limited, Ilford, England, a British company
Filed Nov. 6, 1961, Ser. No. 158,924
Claims priority, application Great Britain Nov. 10, 1960
2 Claims. (Cl. 138—31)

This invention relates to air-balanced hydraulic accumulators and has for an object to provide improved accumulators which can be stored for long periods when charged with air under pressure without appreciable deterioration of the accumulator or loss of air, and in which the risk of jamming is very small.

According to the present invention the hydraulic chamber of the accumulator is separated from the air chamber by a movable metal partition which is connected in an air-tight manner with a cylindrical bellows which extends in the direction of the movement of the partition during loading and unloading of the accumulator and the free end of which is connected to the wall of the accumulator in an air-tight manner at or near one of the ends of the accumulator so that the bellows is altered in length by the movement of the partition. The accumulator is subdivided into two members by a cup-shaped movable partition the hollow side of which faces away from the hydraulic inlet of the accumulator and which is connected at or near its free edge in an air-tight manner to a cylindrical bellows which is located between the container wall and the outer side of the cylindrical portion of the cup-shaped partition, and the free end of which is connected in an air-tight manner to the container wall at or near the end containing the hydraulic inlet so as to be extended when the partition is moved by hydraulic pressure to compress the air in the accumulator.

In this form of the invention a perforated guiding tube, secured to the hydraulic-inlet end of the accumulator and extending about half-way along the container, is preferably arranged between the cylindrical bellows and the cylindrical portion of the cup-shaped partition.

FIGURES 1A, 1B, and 2 of the drawings accompanying the specification illustrate one embodiment of the invention.

FIGURE 1 is an axial section of the accumulator,
FIGURE 1A showing the accumulator when empty of hydraulic liquid, and
FIGURE 1B showing it when fully charged with hydraulic liquid.
FIGURE 2 shows one of the stabilising rings.

Referring now to the drawing, the accumulator comprises a metal container or pressure vessel having a cylindrical outer wall 1 and two end caps 2 and 3. These end caps are permanently sealed to the outer wall by welding, brazing (e.g., silver soldering), resin bonding or other suitable means. The cap 2 is provided with an inlet 2a for pressurising air, said inlet incorporating a cock and a pre-set pressure-release valve 2b while the other end cap 3 is provided with a central oil inlet 3a and with a bleed port 3b normally closed by a plug 3c. A partition, subdividing the interior of the pressure vessel into two chambers for air and oil respectively, is formed by a cup-shaped member 6 having a flat bottom 6a of metal facing the end cap 3 and a stepped cylindrical metal sleeve 6b, 6c extending from the flat bottom 6a towards the end cap 2 of the air chamber, and a cylindrical metal bellows 4 one end of which is seam-welded at 4a to the free end of the wider-diameter part 6c of the stepped cylindrical sleeve 6b, 6c, while its other end is seam-welded at 4b to a suitably projecting boss 3d of the end cap 3. A perforated tubular metal guide sleeve 5 extends inside the bellows 4 for approximately the length of the smaller-diameter portion 6b of the stepped sleeve to guide the closed end of the partition member 6 independently of the bellows 4.

Suitably shaped stabiliser rings 7 of semi-rigid synthetic resin material, for example, of polytetrafluoroethylene, are inserted during the manufacture of the bellows 4 in the inwardly facing folds of the bellows to limit the compression of the latter when the accumulator is empty of hydraulic liquid and there is no oil pressure. These rings are preferably notched at their inner edge as shown at 8 to permit liquid to flow along the outer surface of the guide tube when hydraulic oil is pumped into the accumulator. The rings may alternatively be made of metal or other synthetic resin and may, if desired, be cut radially. In this case they may, if made of sufficiently resilient material, be inserted into the folds after manufacture of the bellows instead of being inserted during the manufacture of the bellows.

The air chamber of the accumulator may be charged with air at a desired pressure, which is retained therein by closing the cock in the air inlet 2b, and may be stored in this condition almost indefinitely. When the accumulator is installed, hydraulic fluid is pumped into the oil inlet 3a and, provided the oil pressure is sufficient to balance the air pressure in the accumulator, the oil will force the cup-shaped member 6 back, thus charging the accumulator. To release air from the oil chamber, the bleeding plug 3c in port 3b is initially loosened until all air has escaped from the oil chamber, and is then tightened again. The amount of oil that can be pumped into the accumulator is limited by abutment of the free edge of the cylinder portion 6c of the cup-shaped member 6 against the cover 2, thereby avoiding the risk of an excessive rise in the air pressure.

What we claim is:
1. An air-balanced hydraulic accumulator, comprising a cylindrical pressure vessel having an air-pressure connection at one end and a hydraulic-pressure connection at the other end, a cylindrical bellows arranged in said vessel and having one end sealingly secured to the pressure vessel at one end thereof, a cup-shaped movable partion having a cylindrical wall portion arranged within the bellows and a bottom closing the end of said wall portion nearest to said one end of the vessel, the free end of the bellows being sealingly secured to the open end of the cylindrical wall portion of the partition, and a cylindrical guide wall fixed into, and extending into the vessel for part of the length of the vessel from, said one end of the vessel inside the bellows and in sliding contact with the other side of the cylindrical wall portion, said guide wall being so constructed as to permit the passage of fluid from one side to the other of said guide wall.

2. An accumulator as claimed in claim 1, wherein the bellows is attached to that end of the vessel which is equipped with the hydraulic-pressure connection, the accumulator further comprising stabilising rings in the inwardly facing corrugations of the bellows, said rings being so shaped as to prevent these corrugations from collapsing when the accumulator is under air pressure in the absence of hydraulic pressure.

References Cited in the file of this patent
UNITED STATES PATENTS

| | | |
|---|---|---|
| 2,365,994 | Ashton | Dec. 26, 1944 |
| 2,411,315 | Ashton | Nov. 19, 1946 |
| 2,688,984 | Snyder | Sept. 14, 1954 |
| 3,019,818 | Everett | Feb. 6, 1962 |